US012409095B2

(12) United States Patent
Liu et al.

(10) Patent No.: US 12,409,095 B2
(45) Date of Patent: Sep. 9, 2025

(54) FEMALE-SPECIFIC NEGATIVE PRESSURE MASSAGE DEVICE AND MASSAGE STRUCTURE THEREOF

(71) Applicants: BIBOTING INTERNATIONAL CO., LTD., Taoyuan (TW); Po-Chang Liu, Taoyuan (TW)

(72) Inventors: Po-Chang Liu, Taoyuan (TW); Li-Pin Yuan, Taoyuan (TW)

(73) Assignees: BIBOTING INTERNATIONAL CO., LTD., Taoyuan (TW); Po-Chang Liu, Taoyuan (TW)

( * ) Notice: Subject to any disclaimer, the term of this patent is extended or adjusted under 35 U.S.C. 154(b) by 873 days.

(21) Appl. No.: 17/676,769

(22) Filed: Feb. 21, 2022

(65) Prior Publication Data

US 2023/0263697 A1 Aug. 24, 2023

(51) Int. Cl.

*A61H 9/00* (2006.01)
*A61H 23/02* (2006.01)
*A61H 39/00* (2006.01)

(52) U.S. Cl.

CPC ........... *A61H 9/0057* (2013.01); *A61H 23/02* (2013.01); *A61H 39/007* (2013.01); *A61H 2201/1207* (2013.01); *A61H 2201/169* (2013.01); *A61H 2205/087* (2013.01)

(58) Field of Classification Search

CPC .......... A61H 9/0057; A61H 2009/0064; A61H 9/00; A61H 9/005; A61H 19/30; A61H 19/32; A61H 19/34; A61H 2205/087; A61H 23/02–0263; A61H 2023/0209–029; A61H 39/007; A61M 1/912; A61M 1/915;

(Continued)

(56) References Cited

U.S. PATENT DOCUMENTS

2015/0196454 A1 * 7/2015 Levy ...................... A61H 19/32
600/38
2020/0163826 A1 * 5/2020 Topolev ............. A61H 23/0218

FOREIGN PATENT DOCUMENTS

CN 2268503 Y * 11/1997
CN 111789753 A * 10/2020 ............. A61H 23/02
CN 112137872 A 12/2020

(Continued)

OTHER PUBLICATIONS

"JP_2008136776_A" translated version with paragraph numbers. (Year: 2025).*

(Continued)

*Primary Examiner* — Justine R Yu
*Assistant Examiner* — Thomas Z Chang
(74) *Attorney, Agent, or Firm* — Chun-Ming Shih; HDLS IPR SERVICES

(57) ABSTRACT

A female-specific massage structure includes a cup body and a sheath ring. The cup body has a cavity, and two ends of the cup body are an open end and a closed end respectively, and a cup rim is formed at the open end, and a connection hole is formed at the closed end and communicates with the cavity. The sheath ring includes a ring body and a fixing portion extended outwardly from the ring body, and the ring body sheathes the cup rim, and the fixing portion is extended into the cavity. In this way, the massage device and structure not just provide a massage to the reproductive organ only, but also provide a massage to the acupuncture points around the reproductive organ.

10 Claims, 7 Drawing Sheets

(58) Field of Classification Search
CPC ......... A61M 1/96; A61M 1/962; F16B 47/00; A63B 2225/05
See application file for complete search history.

(56) References Cited

FOREIGN PATENT DOCUMENTS

| | | | | | |
|---|---|---|---|---|---|
| CN | 212522377 | U | | 2/2021 | |
| CN | 213788760 | U | | 7/2021 | |
| CN | 113208892 | A | * | 8/2021 | ............... A61F 5/41 |
| CN | 214285822 | U | | 9/2021 | |
| CN | 215193540 | U | | 12/2021 | |
| JP | 2008136776 | A | * | 6/2008 | |
| KR | 20070020988 | A | * | 2/2007 | |
| TW | M611555 | U | | 5/2021 | |
| TW | 732659 | B | | 7/2021 | |
| TW | M618317 | U | | 10/2021 | |
| WO | WO-2008043240 | A1 | * | 4/2008 | ............. A61H 19/44 |

OTHER PUBLICATIONS

“CN2268503” translated version with paragraph numbers. (Year: 2025).*
“KR_20070020988” translated version with paragraph numbers. (Year: 2025).*
“Nanosilver—Beyond Pesticides” print to pdf of the webpage dated Apr. 10, 2021 from the WayBack Machine. (Year: 2025).*
Search Report dated Jun. 29, 2022 of the corresponding PCT patent application No. PCT/CN2022/072671.

* cited by examiner

FEMALE-SPECIFIC NEGATIVE PRESSURE MASSAGE DEVICE AND MASSAGE STRUCTURE THEREOF

BACKGROUND OF THE DISCLOSURE

Technical Field

The technical field relates to a massage device, and more particularly relates to a female-specific massage device and a massage structure thereof.

Description of Related Art

The major difference between men and women resides on sexual characteristics, that is, the difference in sexual organs between men and women. Men have sex organs such as penis and scrotum, and women have sex organs such as uterus and vagina. In other words, men and women have obviously different sexual organs, so that venereal diseases of the two are also different.

As to women, the most common diseases are related to irregular menstruation, leucorrhea, lochia, vaginal infection and inflammation, and these diseases are often ashamed for women to seek medical treatment, and thus delaying the best time for treatment. Some other women are willing to seek medical treatment, but doctors can only prescribe medicine for a patient based on the patient's self-report. However, when the patient takes the medicine for treatment, the medicine only provides a slow and curable effect at best and cannot achieve a rapid treatment effect. As a result, the curative effect may not be as good as expected.

In view of the aforementioned drawbacks, the inventor proposes this disclosure based on his expert knowledge and elaborate researches to overcome the drawbacks of the related art.

SUMMARY OF THE DISCLOSURE

It is a primary objective of this disclosure to provide a female-specific massage device and massage structure thereof, which provide a massage to the reproductive organ, and provide a massage to the acupuncture points around the reproductive organ.

To achieve the aforementioned objective, this disclosure discloses a female-specific massage device including a female-specific massage structure, a negative pressure meter and a communicating tube. The female-specific massage structure includes a cup body and a sheath ring, and the cup body has a cavity, and two ends of the cup body are formed with an open end and a closed end respectively, and the open end has a cup rim, and the closed end has a connection hole communicating to the cavity. The sheath ring is adapted to sheathe the cup rim and includes a ring body, and the ring body has an abutting surface on a side of the ring body away from the cup body, and the abutting surface is a concave curved surface. The negative pressure meter has a negative pressure suction hole, and two ends of the communicating tube are connected to the connection hole and the negative pressure suction hole of the cup body respectively.

To achieve the aforementioned objective, this disclosure discloses a female-specific negative pressure massage structure including a cup body and a sheath ring. The cup body has a cavity, and two ends of the cup body are formed with an open end and a closed end respectively, and the open end has a cup rim, and the closed end has a connection hole communicating to the cavity. The sheath ring is adapted to sheathe the cup rim and includes a ring body, and the ring body has an abutting surface on a side of the ring body away from the cup body, and the abutting surface is a concave curved surface. The negative pressure meter has a negative pressure suction hole, and two ends of the communicating tube are connected to the connection hole and the negative pressure suction hole of the cup body respectively.

This disclosure has the following effects. The soft material of the sheath ring may reduce the pressing force exerted on the vulva in vacuum negative pressure. The design of the massage column and massage bumps provides users the options of using the massage device according to their own needs and somatosensation. With the installation of the vibration generator, the users' acupuncture points may also be massaged during the negative pressure massage to provide a better physiotherapy effect. The massage device may be used at home to avoid the inconvenience and embarrassment caused by the frequent hospital visits for the treatment. The device of this disclosure brings tremendous convenience to the users and also has the advantages of small volume, easy-to-carry feature, and compact size.

BRIEF DESCRIPTION OF THE DRAWINGS

The technical characteristics of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

Figure 1:
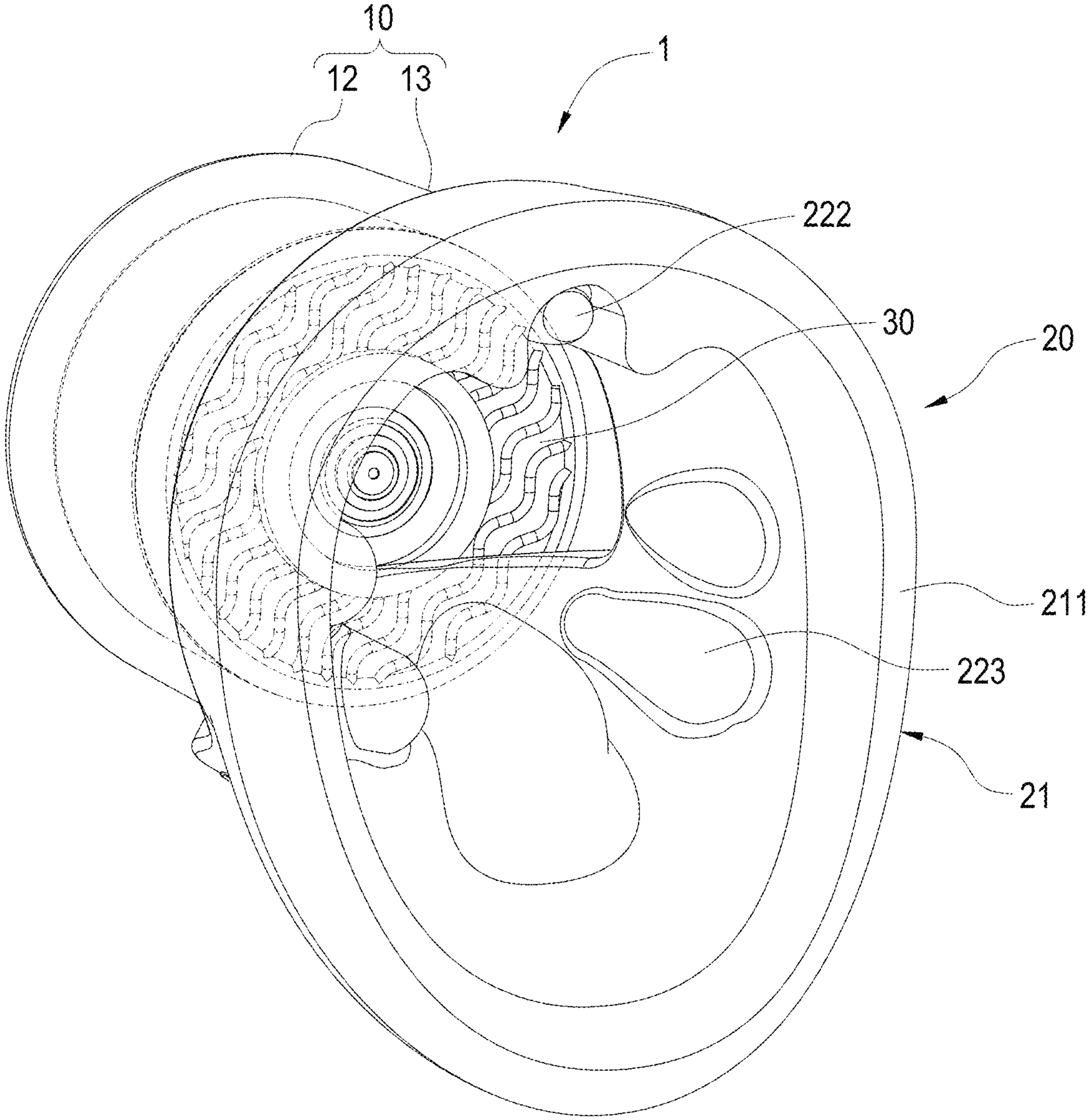
FIG. 1 is a perspective view of a female-specific massage structure of this disclosure.
Figure 2:
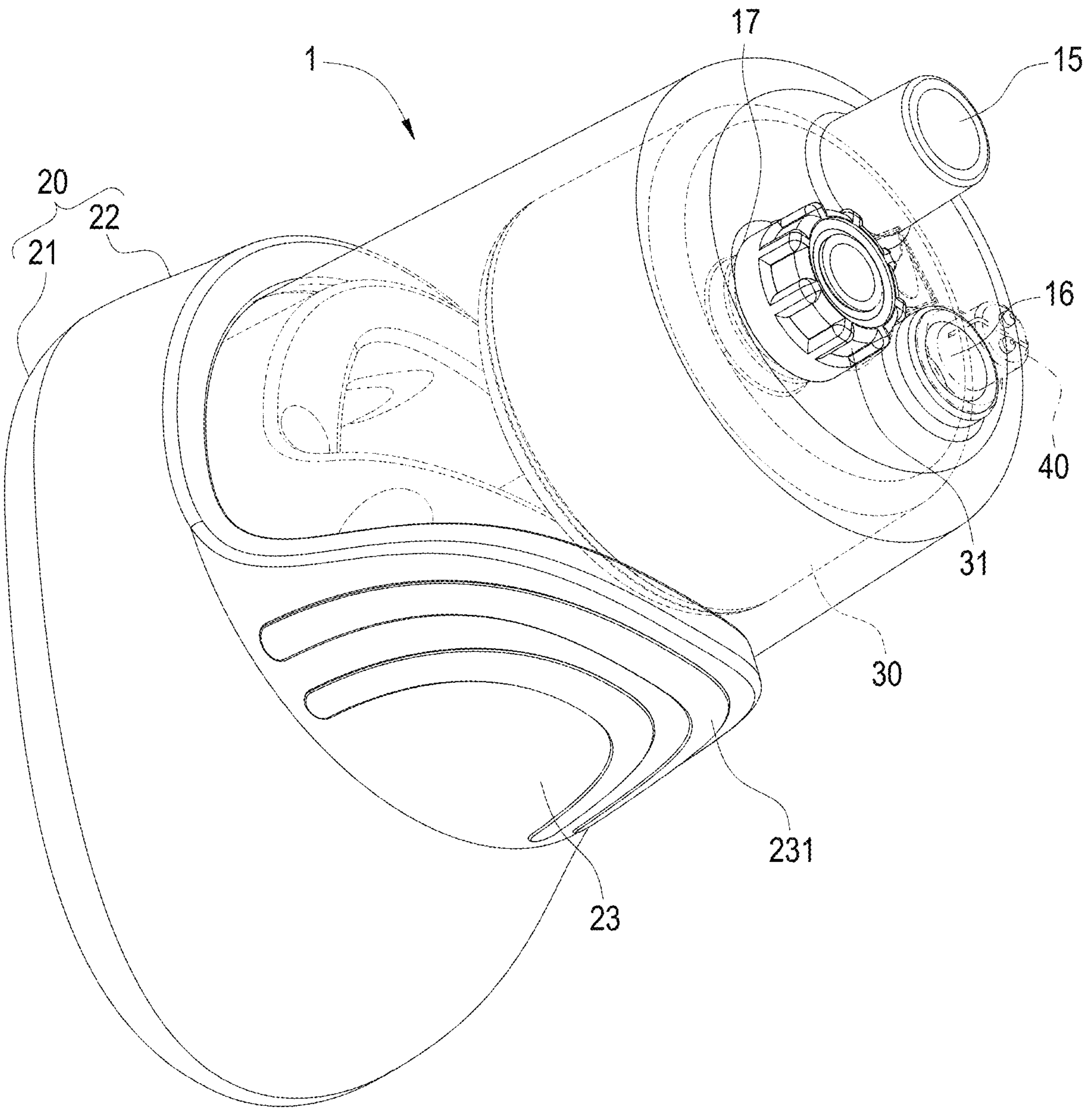
FIG. 2 is another perspective view of a female-specific massage structure of this disclosure.
Figure 3:
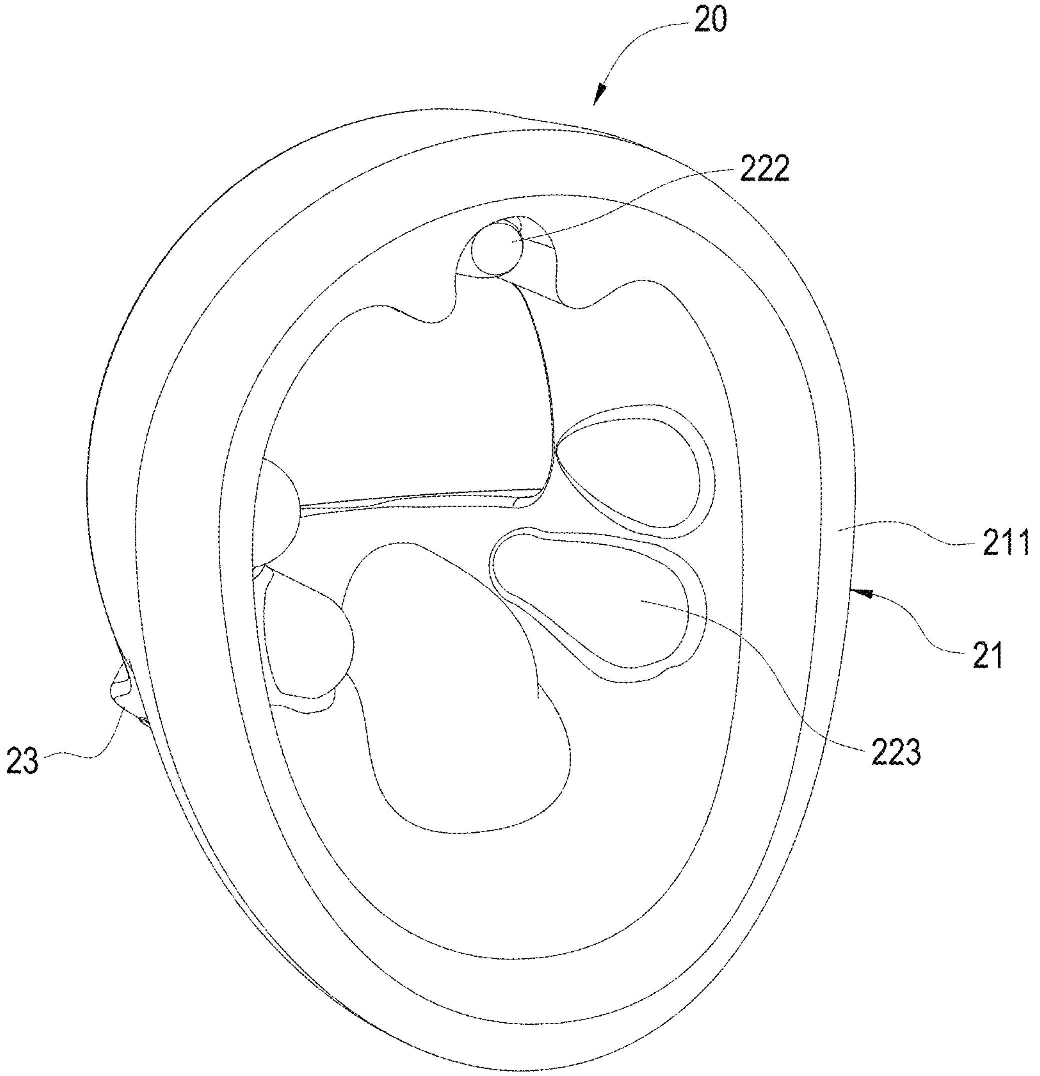
FIG. 3 is a bottom view of a sheath ring of this disclosure.
Figure 4:
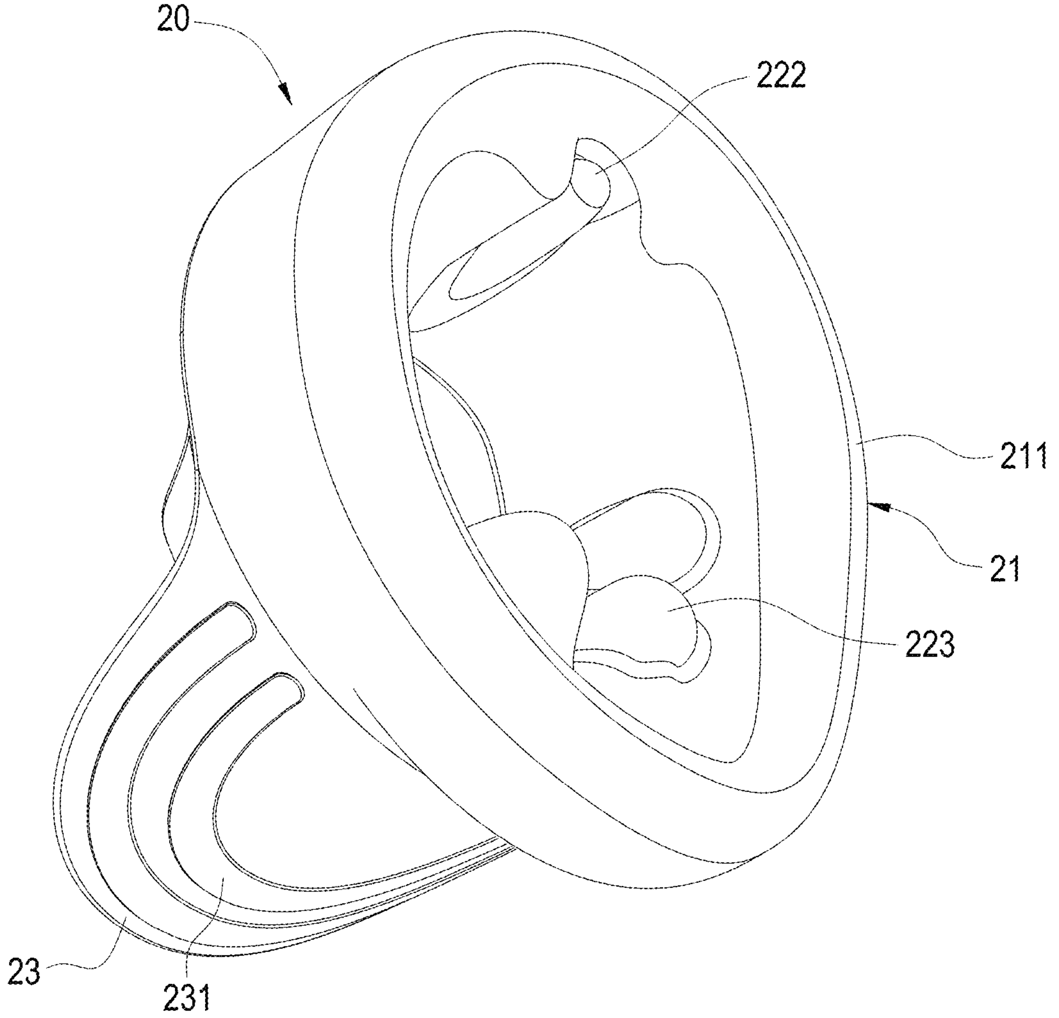
FIG. 4 is a perspective view of a sheath ring of this disclosure.
Figure 5:
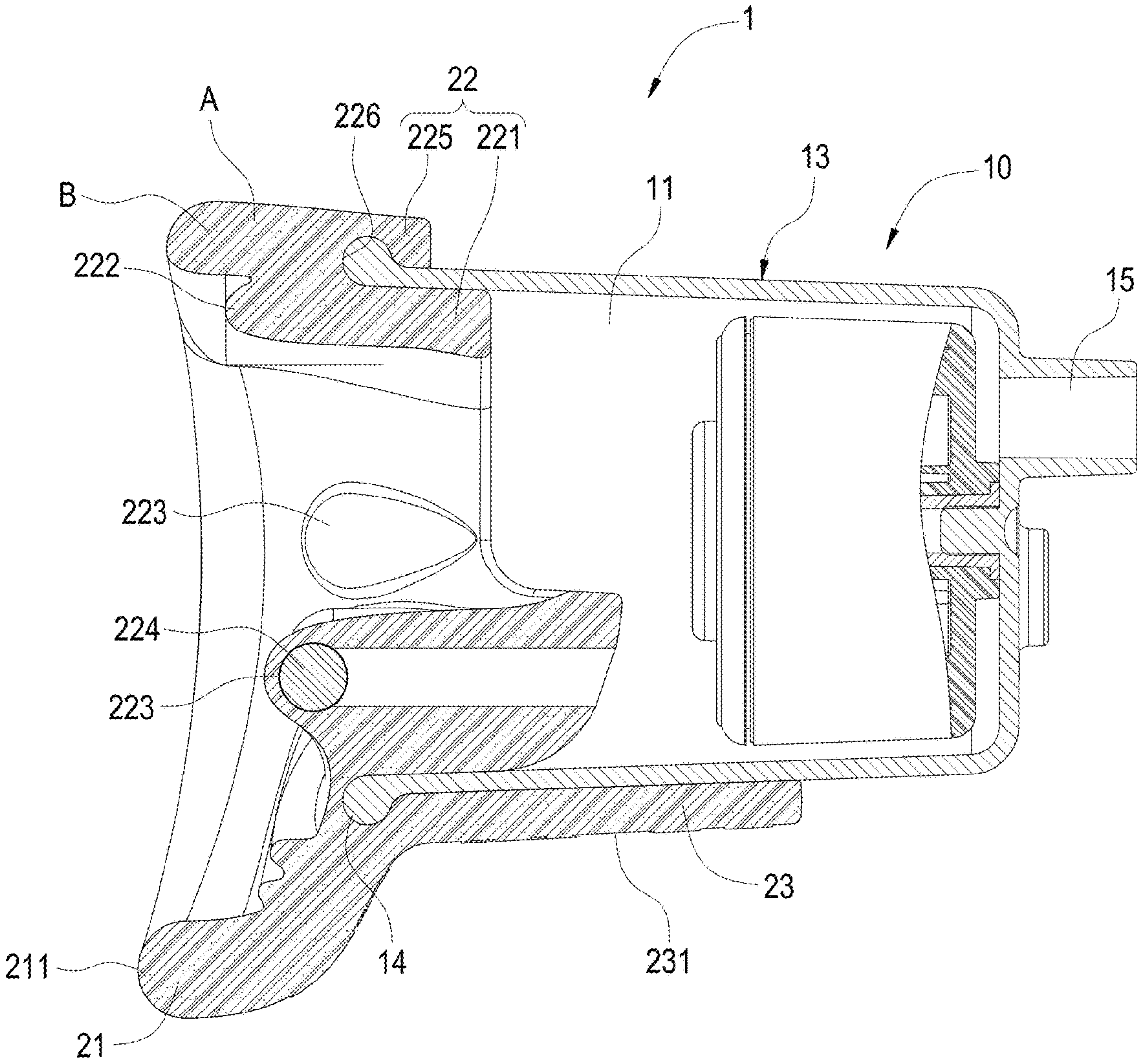
FIG. 5 is a cross-sectional view of a female-specific massage structure of this disclosure.

The technical contents of this disclosure will become apparent with the detailed description of embodiments accompanied with the illustration of related drawings as follows. It is intended that the embodiments and drawings disclosed herein are to be considered illustrative rather than restrictive.

With reference to FIGS. 1 to 5 for a female-specific massage structure 1 of this disclosure, the female-specific massage structure 1 includes a cup body 10 and a sheath ring 20.

The cup body 10 is a component made of a material including but not limited to metal, plastic, and glass. The cup body 10 is substantially in a cylindrical shape and has a cavity 11 formed inside the cup body 10, and two ends of the cup body 10 are formed with an open end 12 and a closed end 13 respectively, and the open end 12 has a cup rim 14, and the closed end 13 has a connection hole 15 communicating to the cavity 11. In addition, a plunger hole 16 and an electrical connection hole 17 are formed on a side of the connection hole 15 of the cup body 10. The plunger hole 16 communicates with the cavity 11 and is provided for installing a pressure relief member 40.

The sheath ring 20 sheathes the cup rim 14 and includes a ring body 21 and a fixing portion 22 extended outwardly from the ring body 21, and the fixing portion 22 sheathes the cup rim 14. The ring body 21 is substantially in an elliptical shape and an abutting surface 211 is disposed on a side of the ring body 21 away from the cup body 10. The abutting surface 211 is a concave curved surface.

In an embodiment, the fixing portion 22 includes an inner ring 221 and an outer ring 225 extended outwardly from the inner ring 221 and formed at an outer periphery of the inner ring 211, and an embedded groove 226 is formed between the outer side of the inner ring 221 and the inner side of the outer ring 225, and the cup rim 14 is plugged and connected to the embedded groove 226 correspondingly. The upper middle part of the inner ring 221 has a massage column 222, and the bottom surface of the inner ring 221 has a plurality of massage bumps 223 spaced apart from one another, and a magnet 224 is buried into each of the massage bumps 223.

In an embodiment, the sheath ring 20 is a component made of a soft plastic material with a hardness (Shore Hardness) falling within a range of about 10 HA to about 100 HA. In this way, the ring body 21 of the sheath ring 20 may be attached closely to the surface of the users' skin to reduce the discomfort caused by the pulling of the skin when the cup rim 14 is attached directly to the skin. If the hardness is less than 10 HA, the texture of the sheath ring 20 may be too soft and lack of support. If the hardness is greater than 100 HA, the texture of the sheath ring 20 may be too hard, thereby causing discomfort at the contact position.

In an embodiment, the sheath ring 20 is formed by mixing a silver ion antibacterial powder A with a silicone B. Specifically, the sheath ring 20 is composed of about 0.5 wt % to about 5 wt % of silver ion antibacterial powder A mixed with about 95 wt % to about 99.5 wt % of silicone B. In this way, the sheath ring 20 has the antibacterial effect. If the weight percent of the silver ion antibacterial powder A is less than 0.5 wt %, the antibacterial effect may be insufficient. If the weight percent of the silver ion antibacterial powder A is greater than 5 wt %, the cost may be too high.

In an embodiment, the sheath ring 20 further includes an anti-slip member 23 extended from the fixing portion 22 in a direction away from the ring body 21, and an outer surface of the anti-slip member 23 has a plurality of ribs 231 which are not only convenient to grasp during use, but also increase the friction force with the cup body 10, thereby making the combination of the sheath ring 20 with the cup body 10 more stabe and firm.

In an embodiment of this disclosure, the female-specific massage structure 1 further includes a vibration generator 30 having a first electrical connection port 31 passing through the corresponding electrical connection hole 17 to fix the vibration generator 30 in the cavity 11 of cup body 10.

Figure 6:
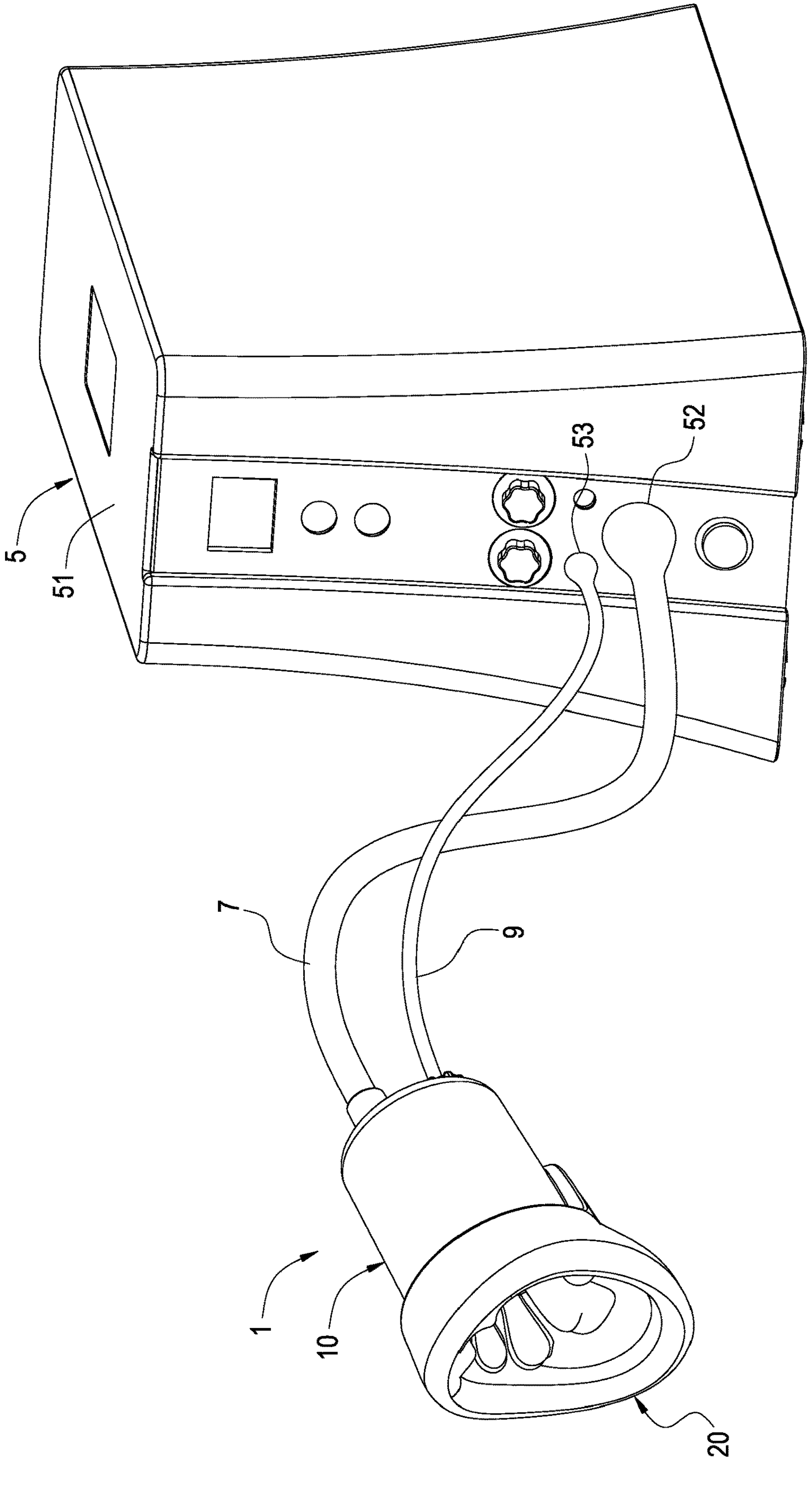
FIG. 6 is a perspective view of a female-specific massage device of this disclosure.

In FIG. 6, this disclosure further provides a female-specific massage device including a female-specific massage structure 1, a negative pressure meter 5 and a communicating tube 7. The negative pressure meter 5 has a host 51, and the host 51 includes a negative pressure suction hole 52, a second electrical connection port 53, an adjusting button, a display unit, an indicating light and other related devices. Two ends of the communicating tube 7 are connected to a connection hole 15 and a negative pressure suction hole 52 of the cup body 10 respectively. In addition, the female-specific massage device of this disclosure further includes a conductive wire 9 with two ends connected to the first electrical connection port 31 and the second electrical connection port 53 respectively.

Figure 7:
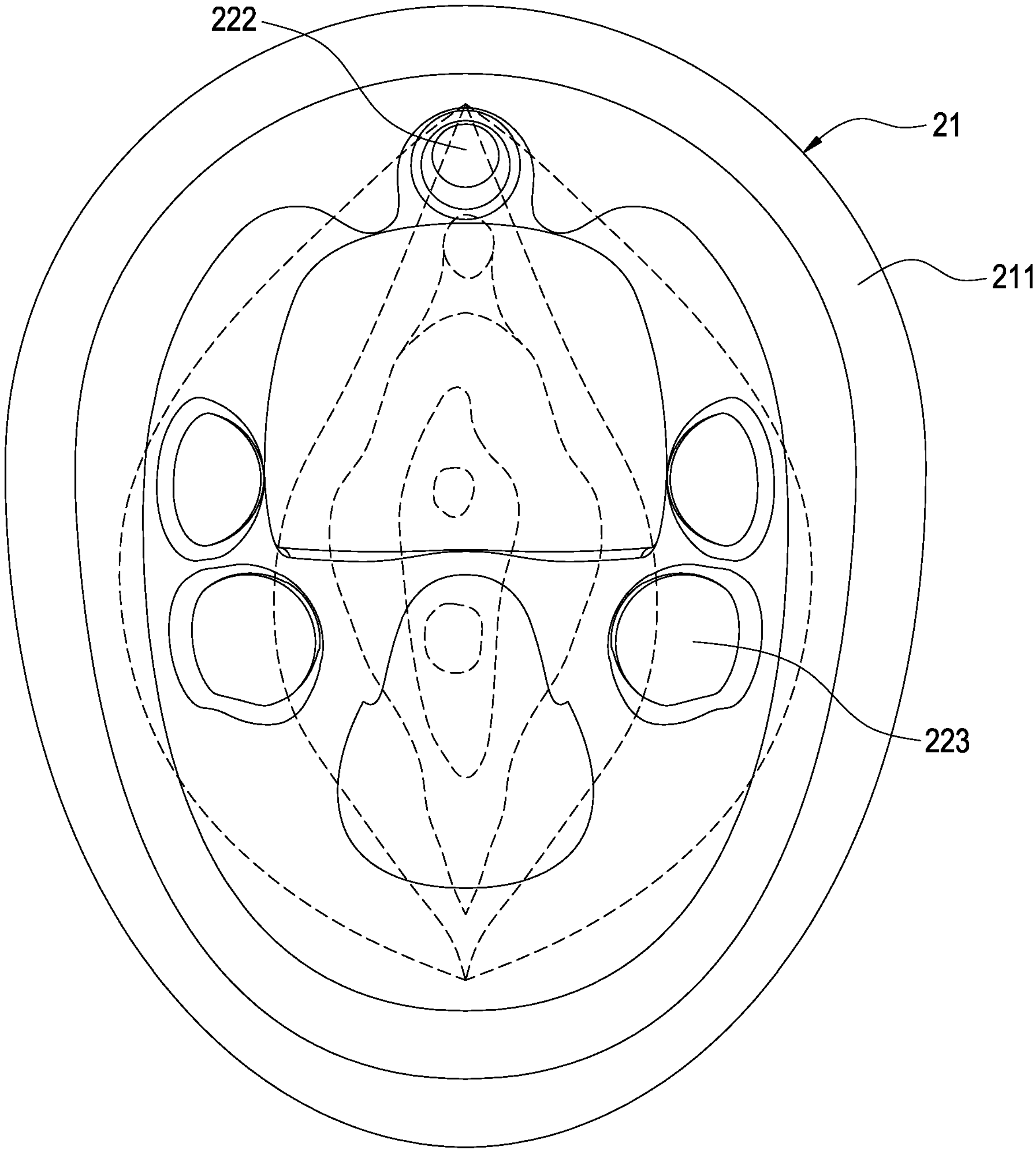
FIG. 7 is a schematic view showing a using status of a female-specific massage structure of this disclosure.

In FIG. 7, the female-specific massage device of this disclosure is mainly used for a negative pressure massage of female private areas. When using, the female-specific massage structure 1 is placed in an area from the user's clitoris to the entire vulva, and the negative pressure meter 5 is used to provide alternate suction and relief for a negative pressure massage or a negative pressure relief massage. The ring body 21 of the sheath ring 20 abuts against the user's pubic bone, and the soft texture of the sheath ring 20 may reduce the pressing pressure exerted on the user's pubic bone during the negative pressure massage to improve the overall comfort of use, and the operation of the massage column 222, the massage bumps 223, the magnets 224 and the vibration generator 30 may perform the negative pressure massage while strengthening the blood circulation and flow in the user's genitals.

In summation of the description above, the female-specific massage device and massage structure of this disclosure may achieve the expected effects and overcome the drawbacks of the related art. While this disclosure has been described by means of specific embodiments, numerous modifications and variations could be made thereto by those skilled in the art without departing from the scope and spirit of this disclosure set forth in the claims.

What is claimed is:

1. A female-specific massage structure, comprising:

a cup body, comprising a cavity, an open end and a closed end disposed on two ends of the cup body, a cup rim disposed on the open end, and a connection hole defined on the closed end communicating to the cavity;

a pressure relief member, and the cup body comprising a plunger hole communicating with the cavity, and the pressure relief member installed in the plunger hole; and a sheath ring, adapted to sheathe the cup rim, comprising a ring body and a fixing portion extended outwardly from the ring body and adapted to sheathe the cup rim, and the ring body comprising an abutting surface disposed on a side thereof away from the cup body, wherein the abutting surface is a concave curved surface;

wherein the fixing portion comprises an inner ring, and the inner ring comprises a massage column disposed on an upper part of the inner ring;

wherein the inner ring further comprises a plurality of massage humps disposed on a lower part of the inner ring, and the massage humps are spaced apart from one another;

wherein each of the massage humps comprises a magnet buried therein.

2. The female-specific massage structure according to claim 1, wherein the fixing portion further comprises an outer ring extended outwardly from the inner ring and disposed at an outer periphery of the inner ring, an embedded groove is disposed between the inner ring and the outer ring, and the cup rim is plugged to and coupled to the embedded groove.

3. The female-specific massage structure according to claim 1, wherein the sheath ring further comprises an anti-slip member extended from the fixing portion in a direction away from the ring body.

4. The female-specific massage structure according to claim 3, wherein the anti-slip member comprises a plurality of ribs disposed on an outer surface thereof.

5. The female-specific massage structure according to claim 1, further comprising: a vibration generator, and the cup body comprising an electrical connection hole, and the vibration generator comprising an electrical connection port passing through the electrical connection hole to fix the vibration generator in the cavity.

6. The female-specific massage structure according to claim 1, wherein the sheath ring comprises a Shore hardness within a range of about 10 HA to about 100 HA.

7. The female-specific massage structure according to claim 1, wherein the sheath ring comprises a mixture of a silver ion antibacterial powder and a silicone.

8. The female-specific massage structure according to claim 7, wherein the silver ion antibacterial powder is about 0.5 wt % to about 5 wt % and the silicone is about 95 wt % to about 99.5 wt %.

9. A female-specific massage device, comprising:

a female-specific massage structure, comprising a cup body and a sheath ring, and the cup body comprising a cavity, an open end and a closed end disposed on two ends of the cup body, a cup rim disposed on the open end, and a connection hole defined on the closed end communicating to the cavity, and the sheath ring adapted to sheathe the cup rim and comprising a ring body and a fixing portion extended outwardly from the ring body and adapted to sheathe the cup rim, and the ring body comprising an abutting surface disposed on a side of the ring body away from the cup body, wherein the abutting surface is a concave curved surface;

a negative pressure meter, comprising a negative pressure suction hole; and a communicating tube, two ends thereof coupled to the connection hole of the cup body and the negative pressure suction hole respectively;

wherein the fixing portion comprises an inner ring, and the inner ring comprises a massage column disposed on an upper part of the inner ring and protruding from a surface of the inner ring;

wherein the inner ring further comprises a plurality of massage humps disposed on a lower part of the inner ring, and the massage humps are spaced apart from one another:

wherein each of the massage humps comprises a magnet buried therein.

10. The female-specific massage structure according to claim 9, further comprising: a conductive wire, and a vibration generator comprising a first electrical connection port, wherein the negative pressure meter further comprises a second electrical connection port, and two ends of the conductive wire are electrically coupled to the first electrical connection port and the second electrical connection port respectively.

* * * * *